United States Patent
Hsieh et al.

(10) Patent No.: US 7,706,156 B2
(45) Date of Patent: Apr. 27, 2010

(54) RESONANT CONVERTER WITH SYNCHRONOUS RECTIFICATION DRIVE CIRCUIT

(75) Inventors: Guan-Chyun Hsieh, Taipei (TW); Wei-Li Hsu, Taipei (TW); Cheng-Yuan Tsai, Taipei (TW)

(73) Assignee: Tung Nan Institute of Technology, Taipei (TW)

( * ) Notice: Subject to any disclaimer, the term of this patent is extended or adjusted under 35 U.S.C. 154(b) by 350 days.

(21) Appl. No.: 11/809,465

(22) Filed: Jun. 1, 2007

(65) Prior Publication Data

US 2008/0144339 A1  Jun. 19, 2008

(30) Foreign Application Priority Data

Dec. 14, 2006  (TW) ............................... 95146949 A

(51) Int. Cl.
  *H02M 3/335* (2006.01)
(52) U.S. Cl. .................................................. 363/21.02
(58) Field of Classification Search ............. 363/21.02, 363/21.06, 15–17, 98, 126, 127
  See application file for complete search history.

(56) References Cited

U.S. PATENT DOCUMENTS

| | | | | |
|---|---|---|---|---|
| 5,430,633 A | * | 7/1995 | Smith | 363/20 |
| 5,838,558 A | * | 11/1998 | Tan et al. | 363/91 |
| 6,130,825 A | * | 10/2000 | Imamura et al. | 363/17 |
| 6,563,719 B1 | * | 5/2003 | Hua et al. | 363/21.06 |
| 6,781,853 B2 | * | 8/2004 | Xu et al. | 363/21.06 |
| 7,016,203 B2 | * | 3/2006 | Xu et al. | 363/21.04 |
| 7,110,269 B2 | * | 9/2006 | Cao et al. | 363/21.03 |
| 7,184,280 B2 | * | 2/2007 | Sun et al. | 363/21.02 |
| 7,193,866 B1 | * | 3/2007 | Huang | 363/22 |
| 7,272,024 B2 | * | 9/2007 | Shao et al. | 363/21.14 |

* cited by examiner

*Primary Examiner*—Adolf Berhane
*Assistant Examiner*—Yemane Mehari
(74) *Attorney, Agent, or Firm*—Haverstock & Owens LLP

(57) ABSTRACT

The present invention provides a resonant converter with a synchronous rectification drive circuit. The resonant converter with the synchronous rectification drive circuit includes a switch circuit, a resonant circuit, a transformer, a full-wave-rectifier circuit and a synchronous rectification drive circuit, wherein the switch circuit at least includes a half-bridge circuit, the resonant circuit is coupled to the switch circuit and has a resonant frequency, the transformer has a primary side coupled to the resonant circuit, the full-wave-rectifier circuit is coupled to a secondary side of the transformer and includes two switches, the synchronous rectification drive circuit includes four voltage-clamped drive circuits having output terminals coupled to the switch circuit and the corresponding switch of the full-wave-rectifier circuit, and each voltage-clamped drive circuit includes a transmission/discharge circuit for reducing the turn-off period of the coupled switch during turning off the coupled switch.

13 Claims, 12 Drawing Sheets

RESONANT CONVERTER WITH SYNCHRONOUS RECTIFICATION DRIVE CIRCUIT

FIELD OF THE INVENTION

This invention relates to a resonant circuit with a synchronous rectification drive circuit, and more particular to an LLC series resonant converter in a power supply.

BACKGROUND OF THE INVENTION

Recently, the trend of the electronic equipments is toward the application with low voltage and high current. The power management technology is developed from the rectification of the rectification diode to the synchronous rectification of the metal-oxide-semiconductor field-effect transistor (MOSFET). The power consumed in the equipment with the rectification diode is more than that consumed in the equipment with the MOSFET; moreover, the performance of the switching power supply can be increased by the latter. The MOSFET is used for the power supply of the LCD TV with low noise and high efficiency and for the power supply of the computer and the telecommunication equipments.

Please refer to FIG. 1(a) showing the circuit of the rectification diode typed LLC series resonant converter in the prior art. The LLC series resonant converter 10 includes a switch circuit 21, a resonant circuit 22, a transformer 23 and a full-wave-rectifier circuit 24.

In FIG. 1(a), the switch circuit 21 is composed of a first switch 211 and a second switch 212, wherein the first switch 211 is composed of a main body $Q_1$ of a first power transistor, a first body-diode $D_{B1}$ and a first parasitic junction capacitor $C_{O1}$, and the second switch 212 is composed of a main body $Q_2$ of a second power transistor, a second body-diode $D_{B2}$ and a second parasitic junction capacitor $C_{O2}$. The first switch 211 is connected to the second switch 212 to form a half-bridge circuit. In addition, the switch circuit 21 can be a full-bridge circuit. The resonant circuit 22 is composed of a resonant inductor $L_r$, a resonant capacitor $C_r$ and a magnetizing inductor $L_m$. It is known by one skilled in the art that the resonant inductor $L_r$ can be composed of a leakage inductor of the transformer 23.

As shown in FIG. 1(a), there is a DC voltage source $V_{DC}$ for the switch circuit 21 to provide an output voltage $V_o$ on a load $R_L$ via the resonant circuit 22, the transformer 23, the full-wave-rectifier circuit 24 and a voltage stabilizing capacitor $C_L$. The switch 21 is separated from the resonant circuit 22 and the full-wave-rectifier circuit 24 by the transformer 23 via a primary side winding set $N_p$ and series connected secondary side winding sets $N_{S1}$ and $N_{S2}$. The full-wave-rectifier circuit 24 is composed of a first rectification diode $D_1$ and a second rectification diode $D_2$ connected to the voltage stabilizing $C_L$. The anode of the first rectification diode $D_1$ is connected to the positive dotted terminal of the secondary side winding set $N_{S1}$, and the anode of the second rectification diode $D_2$ is connected to the negative dotted terminal of the secondary side winding set $N_{S2}$. The junction of the secondary side winding sets $N_{S1}$ and $N_{S2}$ is used as the ground end of the output voltage $V_o$, and the cathodes of the rectification diodes $D_1$ and $D_2$ are used as the high voltage end of the output voltage $V_o$.

Please refer to FIG. 1(b) showing the frequency responses of the resonant converter shown in FIG. 1(a) with various circuit quality factors. As shown in FIG. 1(b), the circuit quality factor $Q_K$ is related to the load $R_L$ and the magnetizing current $i_m$, wherein K=Lm/Lr, and the LLC series resonant converter 10 is equivalent to an LC series resonant converter when K approximates to infinity.

As shown in FIG. 1(b), there are a first resonant frequency $f_{r1}$ and a second resonant frequency $f_{r2}$. The first resonant frequency $f_{r1}$ is related to the resonant inductor $L_r$ and the resonant capacitor $C_r$, the second resonant frequency $f_{r2}$ is related to the resonant inductor $L_r$, the magnetizing inductor $L_m$ and the resonant capacitor $C_r$, and the relationships thereamong are as follows.

$$f_{r1}=1/(2\pi\sqrt{L_r \cdot C_r})$$

$$f_{r2}=1/(2\pi\sqrt{(L_m+L_r) \cdot C_r})$$

As shown in FIG. 1(b), there are three operation frequency regions demarcated by the first resonant frequency $f_{r1}$ and the second resonant frequency $f_{r2}$. The operation switching frequency fs corresponding to the first frequency region Region-1 has the relationship as $f_s > f_{r1}$. The operation switching frequency fs corresponding to the second frequency region Region-2 has the relationship as $f_{r2} < f_s < f_{r1}$. The operation switching frequency fs corresponding to the third frequency Region-3 has the relationship as $f_s < f_{r2}$. In order to achieve the zero voltage switching and the wide range of voltage stabilization, the first frequency region Region-1 and the second frequency region Region-2 are first considered to be used for the LLC series resonant converter 10; however, in order to achieve the zero voltage switching of the first switch 211 and the second switch 212 and to facilitate the design of the drive circuit, it is well known to use the second frequency region Region-2.

Please refer to FIG. 1(c) showing signals of the resonant converter shown in FIG. 1(a), which operates in the second frequency region. In FIG. 1(c), there are a first switch drive signal $V_{GS1}$, a second switch drive signal $V_{GS2}$, a resonant current $i_L$, a magnetizing current $i_m$, a power transfer current $i_p$ and a periodic change of a resonant capacitor voltage drop $V_{Cr}$ operating in the second frequency region Region-2, wherein the power transfer current $i_p$ is zero at $t_0$, $t_1$, $t_2$ and $t_3$, there is zero voltage switching on the main body $Q_1$ of the first power transistor and the main body $Q_2$ of the second power transistor at the dead periods of $t_1$-$t_3$ and $t_4$-$t_6$, and the magnetizing current $i_m$ at the periods is approximately a constant.

Please refer to FIG. 1(d) showing signals of the resonant converter shown in FIG. 1(a), which operates in the first frequency region. In FIG. 1(d), there are a first switch drive signal $V_{GS1}$, a second switch drive signal $V_{GS2}$, a resonant current $i_L$, a magnetizing current $i_m$, a power transfer current $i_p$ and a periodic change of a resonant capacitor voltage drop $V_{Cr}$ operating in the first frequency region Region-1, wherein the main body $Q_1$ of the first power transistor and the main body $Q_2$ of the second power transistor are respectively turned off at $t_1$ and $t_4$; thereupon the power transfer current $i_p$ is gradually decreased, and the energy is continuously transferred to the load. Therefore, the magnetizing current $i_m$ is continuously and linearly increased until the main body of the next power transistor is electrified, and the power transfer current $i_p$ is zero at $t_3$ and $t_6$. The zero voltage switching on the main boy $Q_1$ of the first power transistor and the main body $Q_2$ of the second power transistor is maintained due to the magnetizing current $i_m$ with the triangular waveform.

In FIGS. 1(c) and 1(d), the LLC series resonant converter 10 is practiced by using the rectification diode. However, under the identical conditions, the operation of the LLC series resonant converter in the second frequency region Region-2 fails if the LLC series resonant converter uses the MOSFET as the rectification switch.

Please refer to FIG. 2 showing the circuit of the synchronous rectification typed LLC series resonant converter in the prior art. FIG. 1(a) is compared with FIG. 2. The first rectification diode $D_1$ and the second rectification diode $D_2$ shown in FIG. 1(a) are replaced with the third switch 243 and the fourth switch 244, respectively, and the connection of the high voltage end of the output part and the ground end is changed so as to form the circuit shown in FIG. 2. It means that the third switch 243 is composed of a main body $Q_3$ of a third power transistor and a third body-diode $D_{B3}$, and the fourth switch 244 is composed of the main body $Q_4$ of the fourth power transistor and the fourth body-diode $D_{B4}$. The main bodies $Q_3$ and $Q_4$ of the power transistors have sources connected to the ground end of the output voltage $V_o$. The main body $Q_3$ of the third power transistor has a drain connected to the positive dotted terminal of the secondary side winding set $N_{S1}$. The main body $Q_4$ of the fourth power transistor has a drain connected to the negative dotted terminal of the secondary side winding set $N_{S2}$. In addition, the fourth switch rectification current $i_{Q4}$ flows into the negative dotted terminal of the secondary side winding set $N_{S2}$, and the third switch rectification current $i_{Q3}$ flows into the positive dotted terminal of the secondary side winding set $N_{S1}$.

The operation of the synchronous rectification typed LLC series resonant converter 40 in the second frequency region Region-2 is illustrated as follows. It is set that the first switch drive signal $V_{GS1}$ is identical to the fourth switch drive signal $V_{GS4}$, the second switch drive signal $V_{GS2}$ is identical to the third switch drive signal $V_{GS3}$, and the switch drive signals are identical to those in FIG. 1(c). There is the current through one of the third body-diode $D_{B3}$ and the fourth body-diode $D_{B4}$ at the dead periods of $t_1$-$t_3$ and $t_4$-$t_6$, so as to transfer the power from the secondary side to the primary side of the transformer 23, and therefore the circuit cannot operate normally and safely.

When the synchronous rectification typed LLC series resonant converter operates in the first frequency region Region-1, the converter operates normally due to the magnetizing current $i_m$ with the triangular waveform.

If the conventional synchronous rectification typed LLC series resonant converter 40 shown in FIG. 2 operates in the second frequency region Region-2, there must be different pulse widths for the first switch drive signal $V_{GS1}$ and the fourth switch drive signal $V_{GS4}$. Similarly, there must be different pulse widths for the second switch drive signal $V_{GS2}$ and the third switch drive signal $V_{GS3}$.

In order to practice the operations in the first frequency region Region-1 and the second frequency region Region-2 for the conventional synchronous rectification drive circuit, the drive circuit is quite complicated. Therefore, the cost is high and the energy is wasted owing to ignoring to increase the conversion efficiency.

Accordingly, the drive circuit of the synchronous rectification typed LLC series resonant converter should be simplified to reduce the volume of the circuit, so as to lower the cost and to achieve high efficiency and low noise.

In order to overcome the disadvantages of the prior art described above, the present invention provides a resonant converter with a synchronous rectification drive circuit.

SUMMARY OF THE INVENTION

It is an aspect of the present invention to provide a resonant converter with a synchronous rectification drive circuit including a switch circuit, a resonant circuit, a transformer, a full-wave-rectifier circuit and a synchronous rectification drive circuit, wherein the synchronous rectification drive circuit includes four voltage-clamped drive circuits respectively coupled to the switch circuit and the full-wave-rectifier circuit, and each voltage-clamped drive circuit includes a clamp circuit and a transmission/discharge circuit for reducing the turn-off period of the switch, so as to increase the efficiency of the resonant converter when the switch circuit and the full-wave-rectifier circuit are turned off.

It is another aspect of the present invention to provide a resonant converter with a synchronous rectification drive circuit, wherein there are four voltage-clamped drive circuits divided into two groups, and the two groups are respectively driven to alternately provide identical switch drive signals, so that the resonant converter has an operation switching frequency higher than a resonant frequency thereof for the conversion performance on the wide range of the voltage regulation.

In accordance with the present invention, the resonant converter with a synchronous rectification drive circuit includes a switch circuit having at least one bridge arm having a first switch and a second switch; a resonant circuit coupled to the switch circuit and having a resonant frequency; a transformer having a primary side coupled to the resonant circuit and a secondary side; a full-wave-rectifier circuit coupled to the secondary side and having a third switch and a fourth switch; and a synchronous rectification drive circuit having a first voltage-clamped drive circuit, a second voltage-clamped drive circuit, a third voltage-clamped drive circuit and a fourth voltage-clamped drive circuit, wherein output terminals of the voltage-clamped drive circuits are coupled to the first switch, the second switch, the third switch and the fourth switch, respectively, and each of the voltage-clamped drive circuits includes a transmission/discharge circuit for reducing a turn-off period of the coupled switches during turning off the coupled switches.

In accordance with the present invention, the switch circuit is one of a half-bridge circuit and a full-bridge circuit, and each of the first switch and the second switch is a power transistor including a main body, a body-diode and a parasitic junction capacitor.

In accordance with the present invention, the resonant circuit includes a resonant capacitor, a resonant inductor and a magnetizing inductor in series.

In accordance with the present invention, each of the third switch and the fourth switch is a power transistor including a main body and a body-diode.

In accordance with the present invention, each of the voltage-clamped drive circuits includes a clamp circuit changing an AC drive signal into a DC drive signal, and includes the transmission/discharge circuit coupled to the clamp circuit and having an output terminal coupled to one of the first switch, the second switch, the third switch and the fourth switch for providing one of a first switch drive signal, a second switch drive signal, a third switch drive signal and a fourth switch drive signal.

In accordance with the present invention, the clamp circuit includes a clamp capacitor and a clamp diode.

In accordance with the present invention, the transmission/discharge circuit includes a transmission diode passing the DC drive signal therethrough, and includes a discharge transistor coupled to the clamp circuit, the transmission diode and the coupled switches for accelerating a discharge path during turning off the coupled switches.

In accordance with the present invention, the resonant converter with a synchronous rectification drive circuit includes a first drive transformer having a first primary side winding set and two first secondary side winding sets, wherein the first primary side winding set is connected to a first couple capacitor in series for receiving a first phase signal, and the first secondary side winding sets are respectively coupled to the first voltage-clamped drive circuit and the fourth voltage-clamped drive circuit, and the resonant converter with a synchronous rectification drive circuit further includes a second drive transformer having a second primary side winding set and two second secondary side winding sets, wherein the second primary winding set is connected to a second couple capacitor in series for receiving a second phase signal, and the second secondary side winding sets are respectively coupled to the second voltage-clamped drive circuit and the third voltage-clamped drive circuit.

In accordance with the present invention, the resonant converter with a synchronous rectification drive circuit includes a first isolator having a first input terminal coupled to a drive signal producing device for receiving a first phase signal and having a first output terminal coupled to the fourth voltage-clamped drive circuit for preventing the first phase signal from being interfered by a first signal from the fourth voltage-clamped drive circuit, and the resonant converter with a synchronous rectification drive circuit further includes a second isolator having a second input terminal coupled to the drive signal producing device for receiving a second phase signal and having a second output terminal coupled to the third voltage-clamped drive circuit for preventing the second phase signal from being interfered by a second signal from the third voltage-clamped drive circuit.

In accordance with the present invention, each of the first isolator and the second isolator is a drive transformer or an optical coupler.

In accordance with the present invention, the voltage-clamped drive circuits respectively provide a first, a second, a third and a fourth switch drive signals according to an operation switching frequency and the resonant frequency of the resonant converter for respectively driving the switches.

In accordance with the present invention, as the operation switch frequency is higher than the resonant frequency, the first switch drive signal is identical to the fourth switch drive signal, the second switch drive signal is identical to the third switch drive signal and, the first switch drive signal and the second switch drive signal are alternately produced.

The above aspects and advantages of the present invention will become more readily apparent to those ordinarily skilled in the art after reviewing the following detailed description and accompanying drawings, in which:

DETAILED DESCRIPTION OF THE PREFERRED EMBODIMENT

The invention is described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1A:
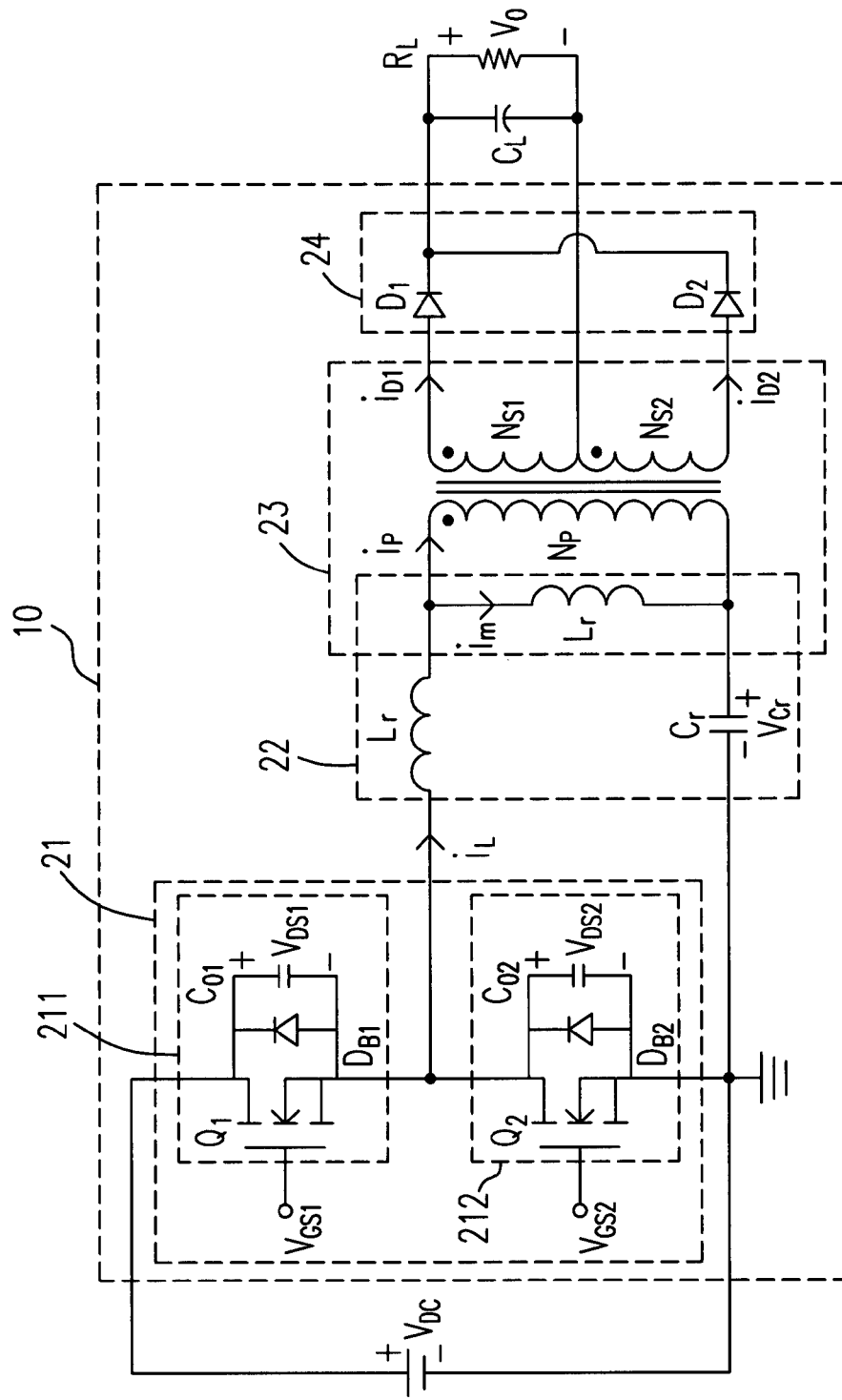
FIG. 1(a) shows a circuit of a rectification diode typed LLC series resonant converter in the prior art.
Figure 1B:
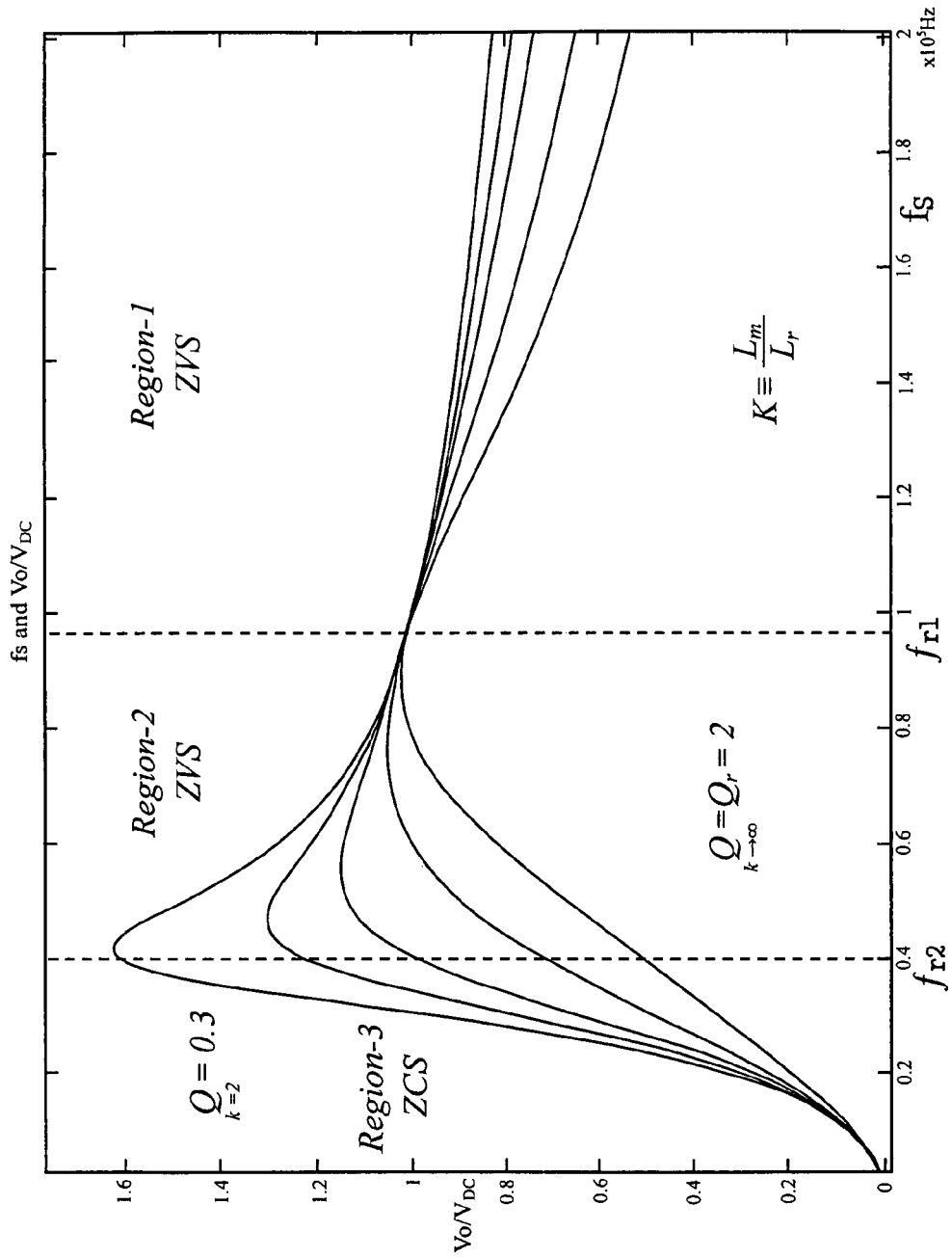
FIG. 1(b) is a diagram showing the frequency response of the resonant converter shown in FIG. 1(a) with various circuit quality factors.
Figure 1C:
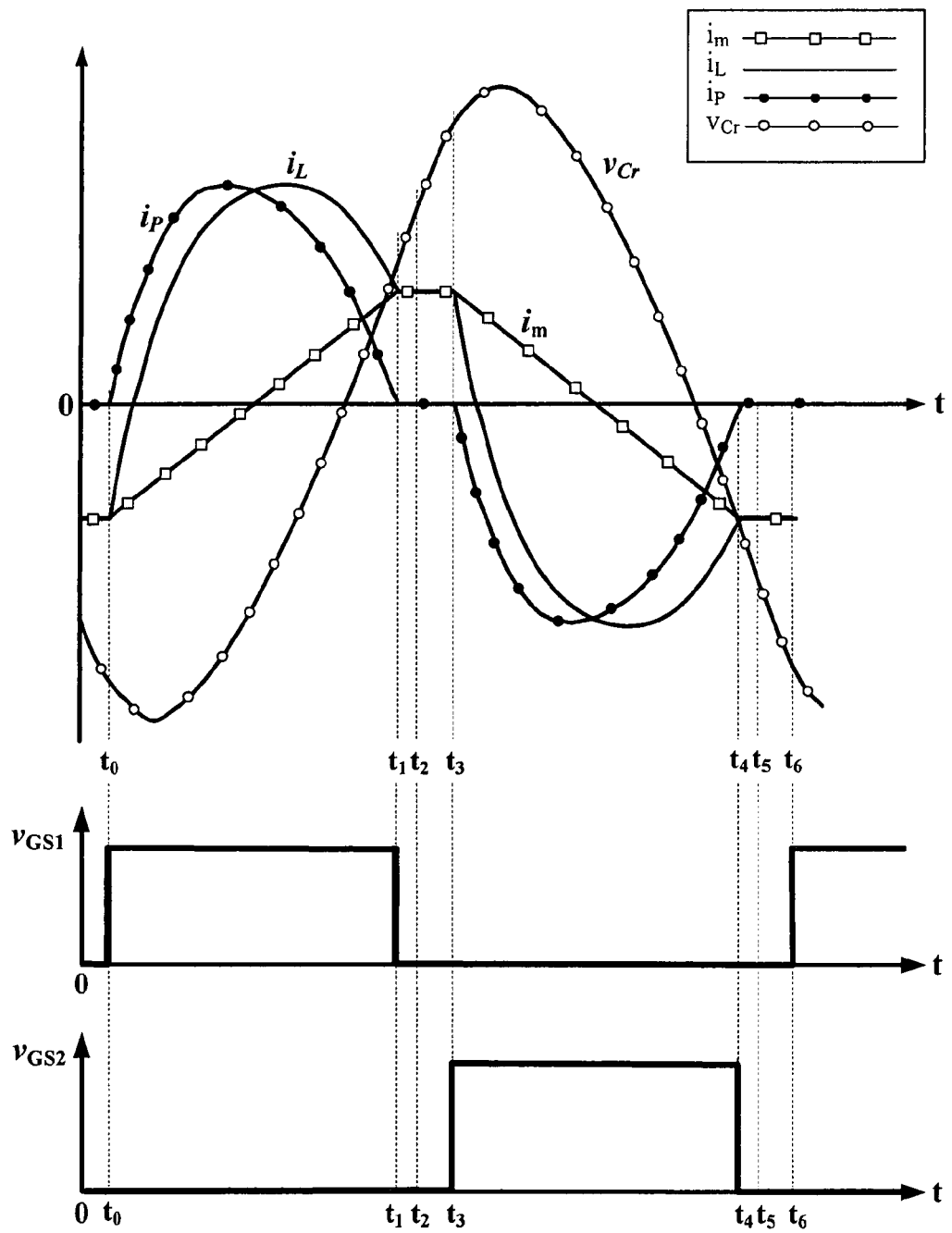
FIG. 1(c) is a diagram showing signals of the resonant converter shown in FIG. 1(a) operated in a second frequency region.
Figure 1D:
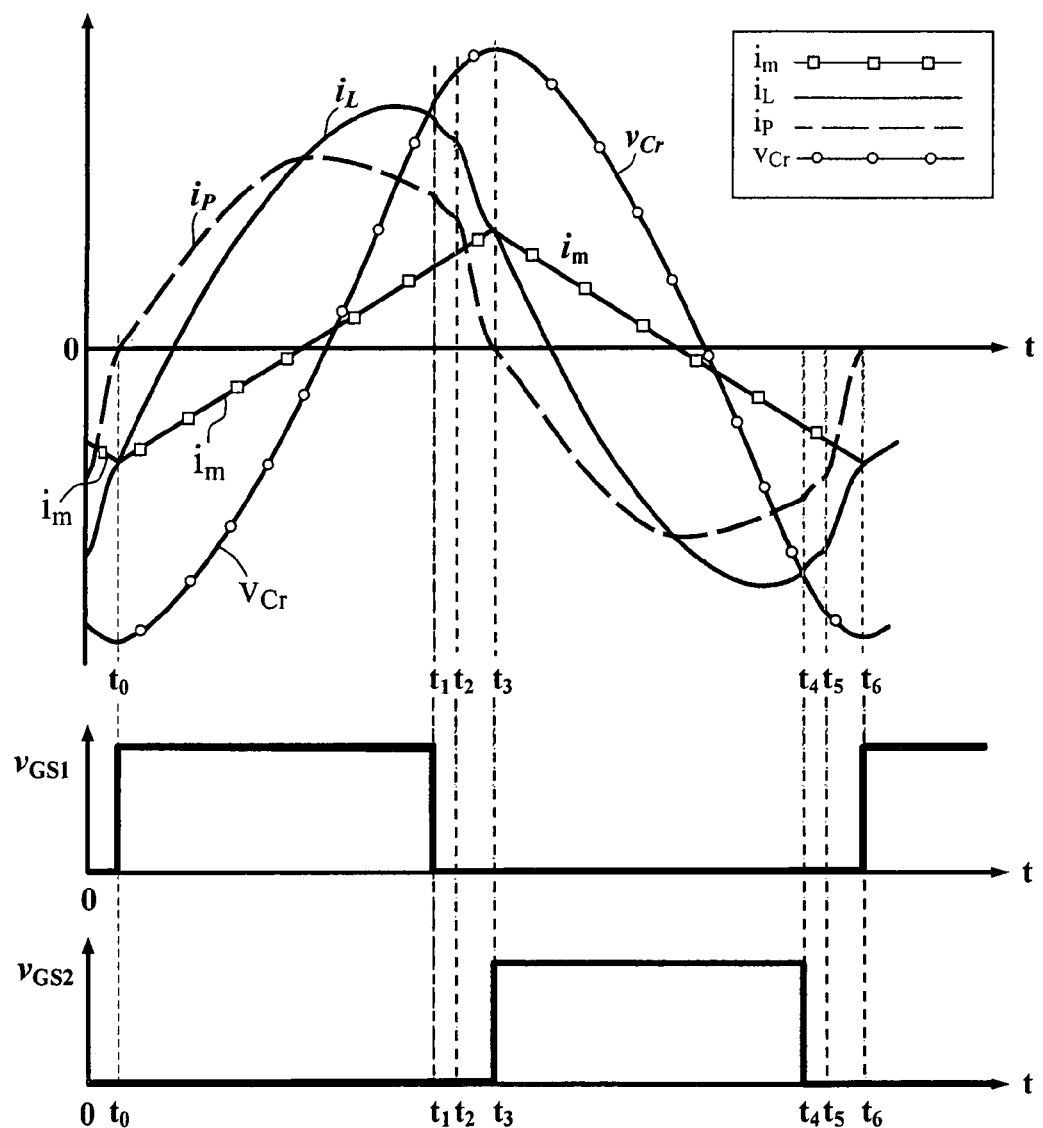
FIG. 1(d) is a diagram showing signals of the resonant converter shown in FIG. 1(a) operated in a first frequency region.
Figure 2:
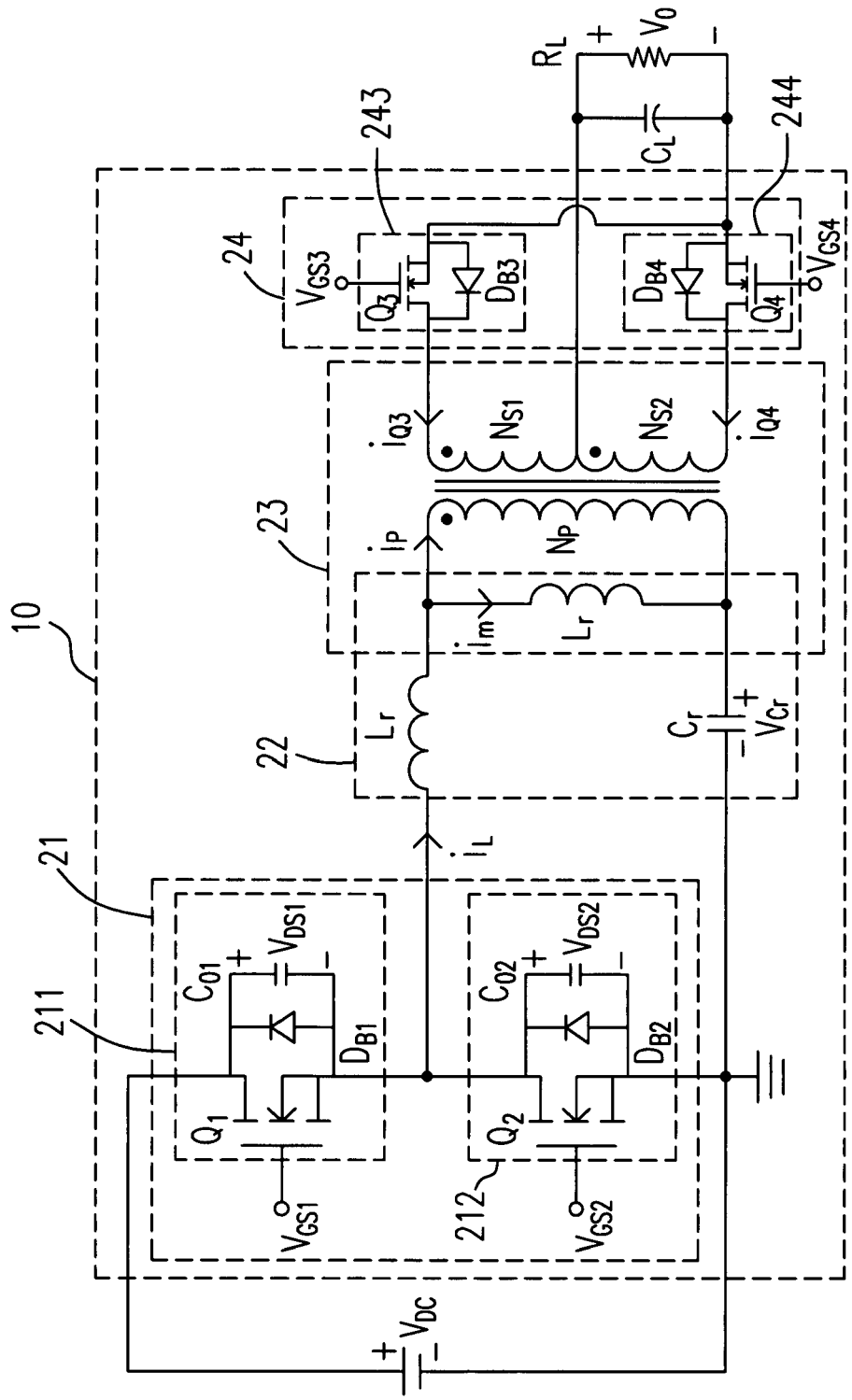
FIG. 2 is a circuit of a synchronous rectification typed LLC series resonant converter in the prior art.
Figure 3:
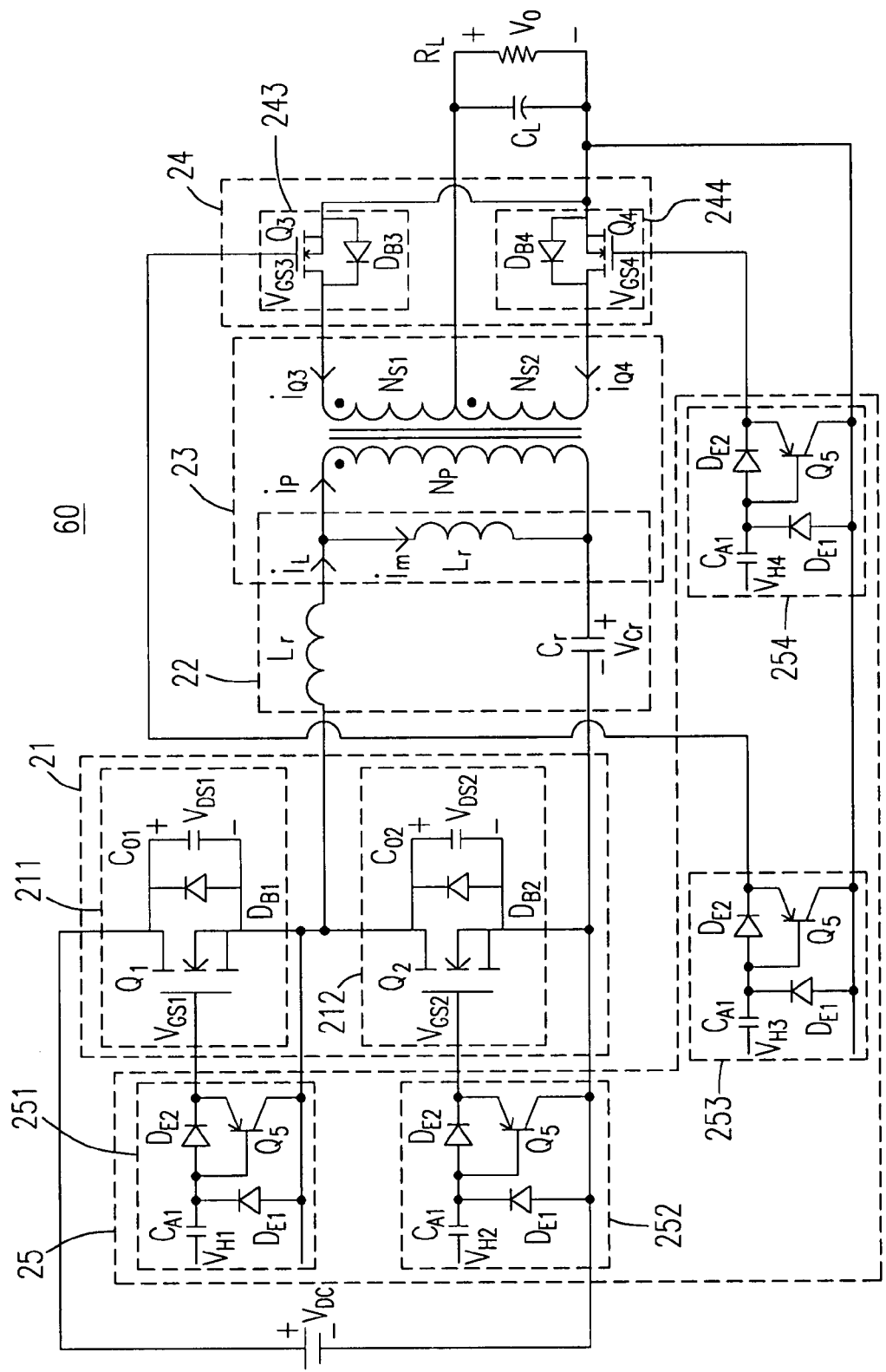
FIG. 3 shows a circuit of a resonant converter with a synchronous rectification drive circuit according to a preferred embodiment of the present invention.

Please refer to FIG. 3 showing a resonant converter with a synchronous rectification drive circuit according to a preferred embodiment of the present invention. In the figures, similar components are denoted as similar reference numbers. It is to be noted that a switch circuit 21 of an input terminal is composed of a half-bridge circuit having a bridge arm in FIG. 3. Alternatively, the switch circuit 21 of the input terminal can be composed of a full-bridge circuit having two bridge arms. The resonant converter 60 has a synchronous rectification drive circuit 25 for implementing the synchronous rectification drive of the present invention. In addition, power transistors are used as the switches in the embodiment of the present invention; however, the term "switch" claimed in the present invention is not limited to the power transistor.

As shown in FIG. 3, the synchronous rectification drive circuit 25 includes a first voltage-clamped drive circuit 251, a second voltage-clamped drive circuit 252, a third voltage-clamped drive circuit 253 and a fourth voltage-clamped drive circuit 254. The first voltage-clamped drive circuit 251 has an input terminal for receiving a first AC drive signal $v_{H1}$, and has an output terminal coupled to the first switch 211 for providing a first switch drive signal $v_{GS1}$ to control turn on/off of the first switch 211. The second voltage-clamped drive circuit 252 has an input terminal for receiving a second AD drive signal $v_{H2}$, and has an output terminal coupled to the second switch 212 for providing a second switch drive signal $v_{GS2}$ to control turn on/off of the second switch 212. The third voltage-clamped drive circuit 253 has an input terminal for receiving a third AD drive signal $v_{H3}$, and has an output terminal coupled to the third switch 243 for providing a third switch drive signal $v_{GS3}$ to control turn on/off of the third switch 243. The fourth voltage-clamped drive circuit 254 has an input terminal for receiving a fourth AD drive signal $v_{H4}$, and has an output terminal coupled to the fourth switch 244 for providing a fourth switch drive signal $v_{GS4}$ to control turn on/off of the fourth switch 244.

As above illustrations, when the resonant converter 60 has an operation switching frequency $f_s$ higher than a resonant frequency $f_{r1}$ thereof, i.e. the resonant converter 60 operates in a first frequency region Region-1, it is set that the first switch drive signal $v_{GS1}$ is identical to the fourth switch drive signal $v_{GS4}$, the second switch drive signal $v_{GS2}$ is identical to the third switch drive signal $v_{GS3}$, and the first switch drive signal $v_{GS1}$ and the second switch drive signal $v_{GS2}$ are alternately produced. When the resonant converter 60 operates in the second frequency region Region-2, there must be different pulse widths for the first switch drive signal $v_{GS1}$ and the fourth switch drive signal $v_{GS4}$. Similarly, there must be different pulse widths for the second switch drive signal $v_{GS2}$ and the third switch drive signal $v_{GS3}$. As shown in FIG. 3, the sequence of the first AC drive signal $v_{H1}$, the second AC drive signal $v_{H2}$, the third AC drive signal $v_{H3}$ and the fourth AC drive signal $v_{H4}$ can be regulated for various synchronous rectification drive conditions. In order to illustrate the practice of the synchronous rectification drive circuit of the present invention, the following embodiments of two synchronous rectification drive circuits 25 are provided to show the arrangement of the synchronous rectification drive circuit 25 when the resonant converter 60 operates in the first frequency region Region-1.

Figure 4:
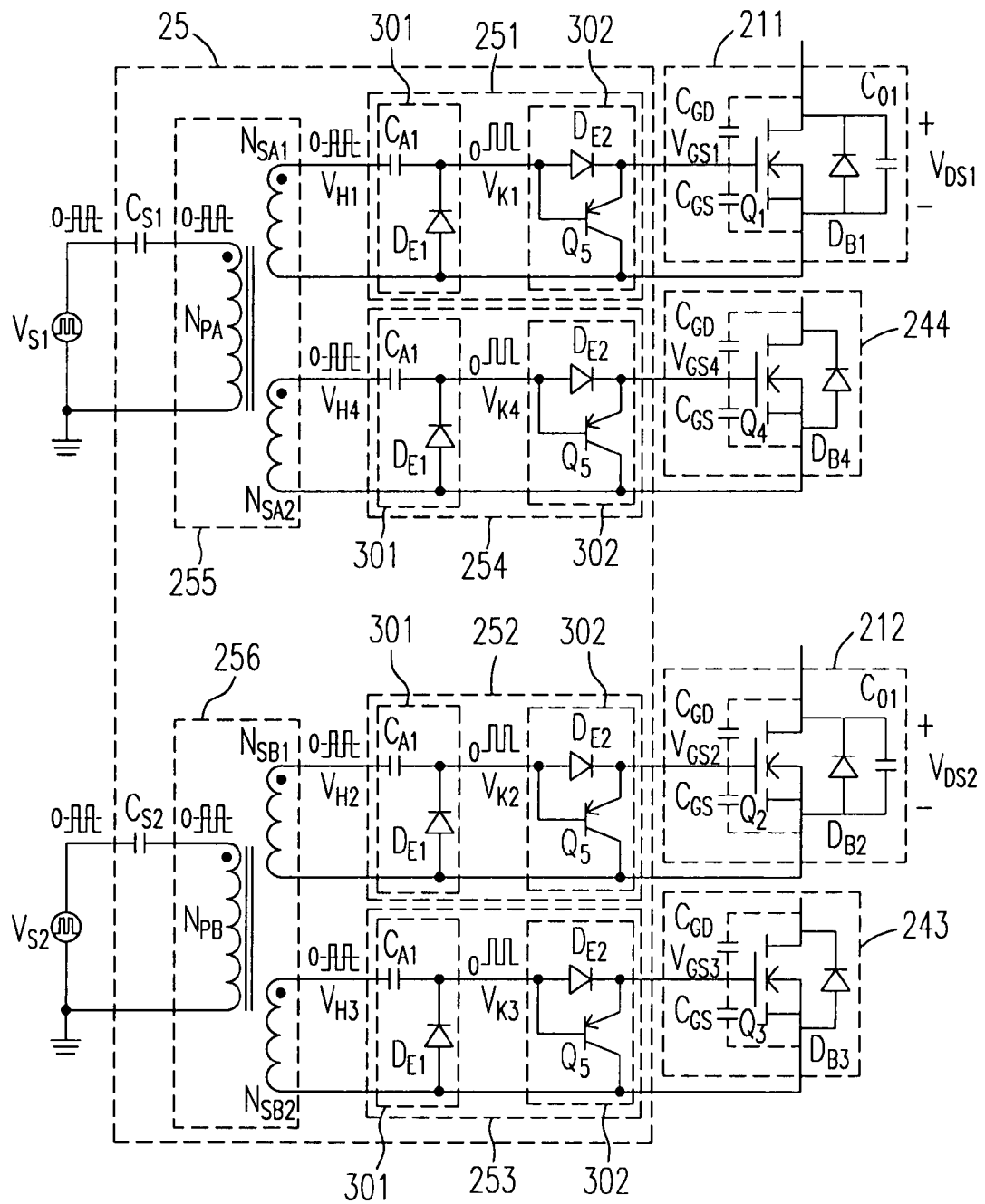
FIG. 4 shows a first preferred embodiment of the synchronous rectification drive circuit according to the present invention.

Please refer to FIG. 4 showing a synchronous rectification drive circuit according to the first preferred embodiment of the present invention. Each of a first voltage-clamped drive circuit 251, a second voltage-clamped drive circuit 252, a third voltage-clamped drive circuit 253 and a fourth voltage-clamped drive circuit 254 of the synchronous rectification drive circuit 25 includes a clamp circuit 301 and a transmission/discharge circuit 302. In the first voltage-clamped drive circuit 251, the clamp circuit 301 is used for raising the first AC drive signal $v_{H1}$ to a first DC drive signal $v_{K1}$, the transmission/discharge circuit 302 is coupled to the clamp circuit 301, and an output terminal is coupled to the first switch 211 for receiving a first DC drive signal $v_{K1}$ to provide the first switch drive signal $v_{GS1}$. In the second voltage-clamped drive circuit 252, the clamp circuit 301 is used for raising the second AC drive signal $v_{H2}$ to a second DC drive signal $v_{K2}$, the transmission/discharge circuit 302 is coupled to the clamp circuit 301, and an output terminal is coupled to the second switch 212 for receiving a second DC drive signal $v_{K2}$ to provide the second switch drive signal $v_{GS2}$. In the third voltage-clamped drive circuit 253, the clamp circuit 301 is used for raising the third AC drive signal $v_{H3}$ to a third DC drive signal $v_{K3}$, the transmission/discharge circuit 302 is coupled to the clamp circuit 301, and an output terminal is coupled to the third switch 213 for receiving a third DC drive signal $v_{K3}$ to provide the third switch drive signal $v_{GS3}$. In the fourth voltage-clamped drive circuit 254, the clamp circuit 301 is used for raising the fourth AC drive signal $v_{H4}$ to a fourth DC drive signal $v_{K4}$, the transmission/discharge circuit 302 is coupled to the clamp circuit 301, and an output terminal is coupled to the fourth switch 214 for receiving a fourth DC drive signal $v_{K4}$ to provide the fourth switch drive signal $v_{GS4}$.

Each clamp circuit 301 includes a clamp capacitor $C_{A1}$ and a clamp diode $D_{E1}$. The transmission/discharge circuit 302 includes a transmission diode $D_{E2}$ and a discharge transistor $Q_5$. The transmission diode $D_{E2}$ is used for passing corresponding DC drive signal therethrough, i.e. when the raising edge of the corresponding DC drive signal is received by the transmission diode $D_{E2}$, an input gate capacitor of the coupled switch is charged. The input gate capacitor is composed of a gate-drain capacitor $C_{GD}$ and a gate-source capacitor $C_{GS}$. When the charging voltage of the gate-source capacitor $C_{GS}$ is higher than the conducting voltage of the coupled switch, the coupled switch is electrically connected. The discharge transistor $Q_5$ is coupled to the clamp circuit 301, the transmission diode $D_{E2}$ and the coupled switch for accelerating a discharge path during turning off the coupled switch, i.e. when the falling edge of the corresponding DC drive signal is received by the transmission diode $D_{E2}$ and the discharge transistor $Q_5$, the discharge transistor $Q_5$ is electrically connected, and store charges of the input gate capacitor are discharged via the discharge transistor $Q_5$, so that the turn-off period of the coupled switch is reduced. Accordingly, it is advantageous to the sequential control of the synchronous rectification drive circuit 25 and raising the power efficiency.

As shown in FIG. 4, the synchronous rectification drive circuit 25 further includes a first drive transformer 255 and a second drive transformer 256. The first drive transformer 255 has a primary side winding set $N_{PA}$ and two secondary side winding sets $N_{SA1}$ and $N_{SA2}$. The primary side winding set $N_{PA}$ is connected to a first couple capacitor $C_{S1}$ for receiving a first phase signal $v_{S1}$. The DC part of the first phase signal $v_{S1}$ would not be transmitted to the primary side winding set $N_{PA}$ of the first drive transformer 255 due to the effect of the first couple capacitor $C_{S1}$. The secondary side winding set $N_{SA1}$ is coupled to the first voltage-clamped drive circuit 251 for providing the first AC drive signal $v_{H1}$, and the secondary side winding set $N_{SA2}$ is coupled to the fourth voltage-clamped drive circuit 254 for producing the fourth AC drive signal $v_{H4}$. The second drive transformer 256 has a primary side winding set $N_{PB}$ and two secondary side winding sets $N_{SB1}$ and $N_{SB2}$. The primary side winding set $N_{PB}$ is connected to a second couple capacitor $C_{S2}$ for receiving a second phase signal $v_{S2}$. The DC part of the second phase signal $v_S$ would not be transmitted to the primary side winding set $N_{PB}$ of the second drive transformer 256 due to the effect of the second couple capacitor $C_{S2}$. The secondary side winding set $N_{SB1}$ is coupled to the second voltage-clamped drive circuit 252 for providing the second AC drive signal $v_{H2}$, and the secondary side winding set $N_{SB2}$ is coupled to the third voltage-clamped drive circuit 253 for producing the third AC drive signal $v_{H3}$.

Figure 5:
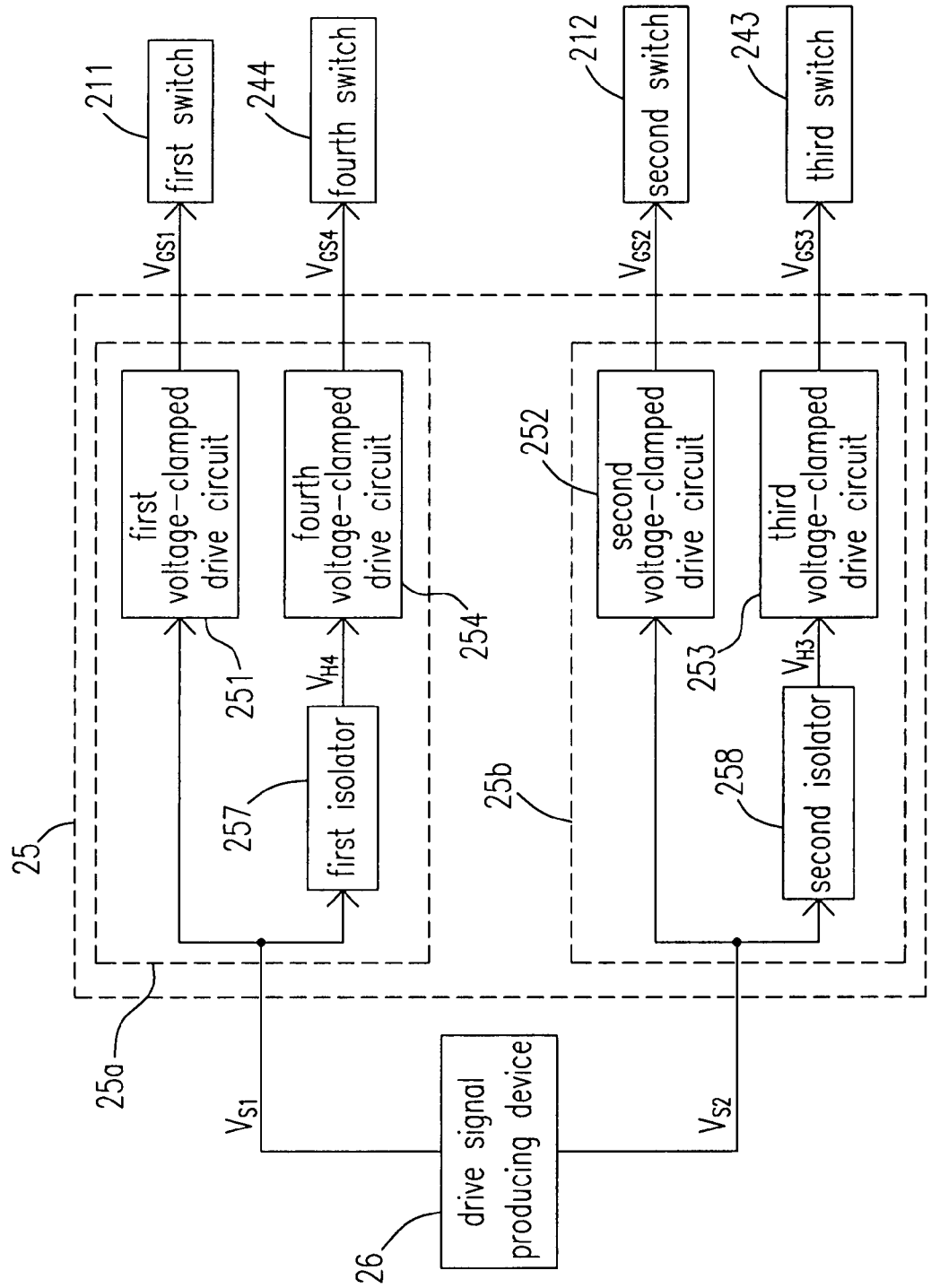
FIG. 5 shows a second preferred embodiment of the synchronous rectification drive circuit according to the present invention.

Please refer to FIG. 5 showing a second preferred embodiment of the synchronous rectification drive circuit according to the present invention. As shown in FIG. 5, the synchronous rectification drive circuit 25 includes a first phase drive circuit 25a and a second phase drive circuit 25b. The first phase drive circuit 25a is coupled to a drive signal producing device 26 for receiving a first phase signal $v_{S1}$, wherein the first phase signal $v_{S1}$ is a square waveform. The first phase signal $v_{S1}$ is processed by the first phase drive circuit 25a for providing the first switch drive signal $v_{GS1}$ and the fourth switch drive signal $v_{GS4}$, so as to drive the first switch 211 and the fourth switch 244, respectively. The second phase drive circuit 25b is coupled to a drive signal producing device 26 for receiving a second phase signal $v_{S2}$, wherein the second phase signal $v_{S2}$ is another square waveform. The second phase signal $v_{S2}$ is processed by the second phase drive circuit 25b for providing the second switch drive signal $v_{GS2}$ and the third switch drive signal $v_{GS3}$, so as to drive the second switch 212 and the third switch 243, respectively.

The first phase drive circuit 25a includes the first voltage-clamped drive circuit 251, the fourth voltage-clamped drive circuit 254 and a first isolator 257. Both the first voltage-clamped drive circuit 251 and the first isolator 257 are coupled to the drive signal producing device 26 for receiving a first phase signal $v_{S1}$. The first phase signal $v_{S1}$ is converted to the first switch drive signal $v_{GS1}$ by the first voltage-clamped drive circuit 251. The first isolator 257 can be a drive transformer, an optical coupler or any other electrical equipments with isolation functions. The first isolator 257 has an output terminal coupled to the fourth voltage-clamped drive circuit 254 for preventing the first phase signal $v_{S1}$ from being interfered by signals of the fourth voltage-clamped drive circuit 254 from the load $R_L$. The fourth AC drive signal $v_{H4}$ is produced by the first isolator 257. The fourth voltage-clamped drive circuit 254 is coupled to the first isolator 257 for receiving the fourth AC drive signal $v_{H4}$ and converting the fourth AC drive signal $v_{H4}$ to the fourth switch drive signal $v_{GS4}$.

The first phase drive circuit 25b includes the second voltage-clamped drive circuit 252, the third voltage-clamped drive circuit 253 and a second isolator 258. Both the second voltage-clamped drive circuit 252 and the second isolator 258 are coupled to the drive signal producing device 26 for receiving a second phase signal $v_{S2}$. The second phase signal $v_{S2}$ is converted to the second switch drive signal $v_{GS2}$ by the second voltage-clamped drive circuit 252. The second isolator 258 can be a drive transformer, an optical coupler or any other electrical equipments with isolation functions. The second isolator 258 has an output terminal coupled to the third voltage-clamped drive circuit 253 for preventing the second phase signal $v_{S2}$ from being interfered by signals of the third voltage-clamped drive circuit 253 from the load $R_L$. The third AC drive signal $v_{H3}$ is produced by the second isolator 258. The third voltage-clamped drive circuit 253 is coupled to the second isolator 258 for receiving the third AC drive signal $v_{H3}$ and converting the third AC drive signal $v_{H3}$ to the third switch drive signal $v_{GS3}$.

The drive circuit shown in FIG. 5 can be used in other converters such as Boost typed, Buck typed and Buck-Boost typed converters.

Figure 6A:
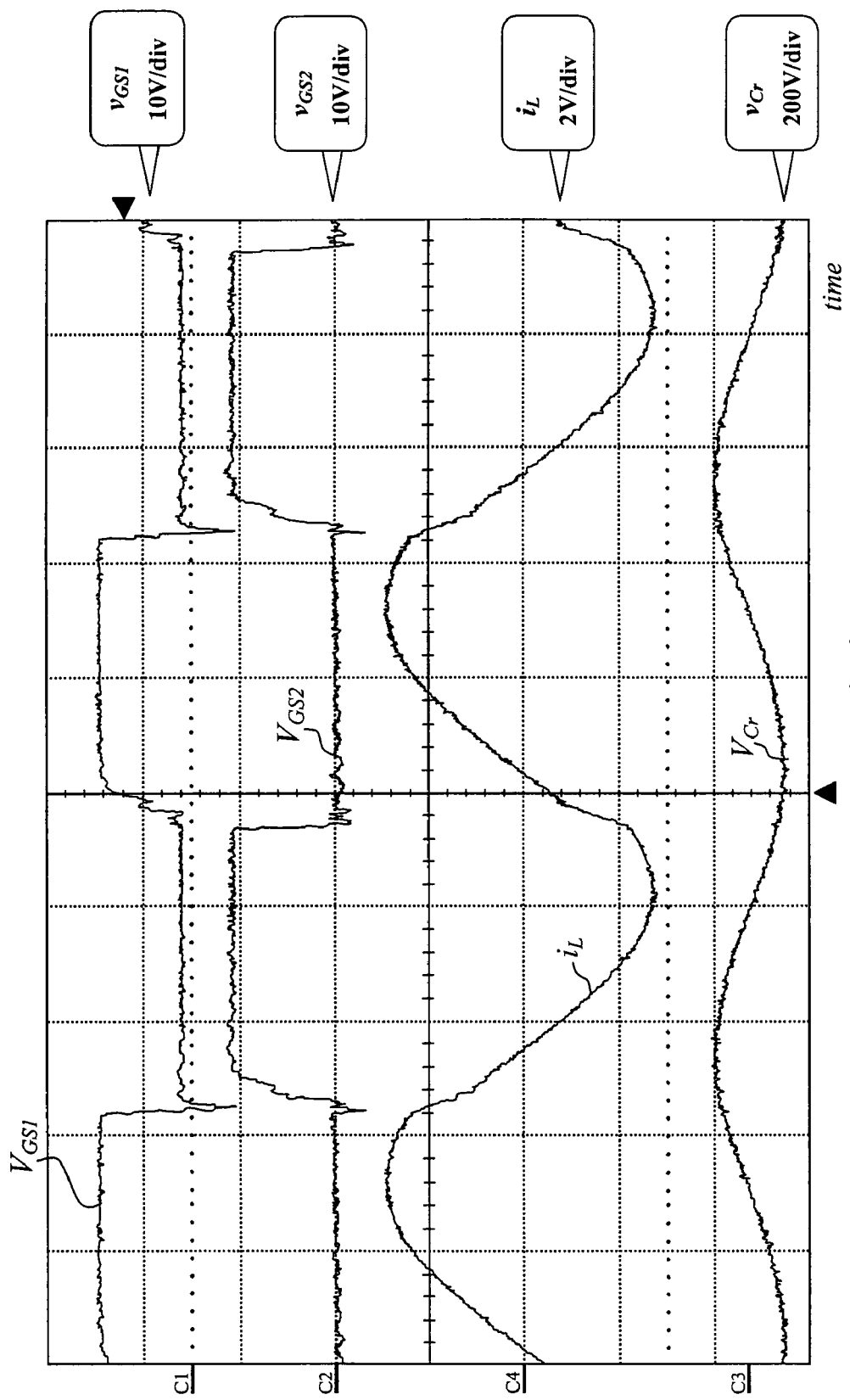
FIG. 6(a) shows signals of the resonant converter shown in FIG. 3 and FIG. 4 according to the present invention.
Figure 6B:
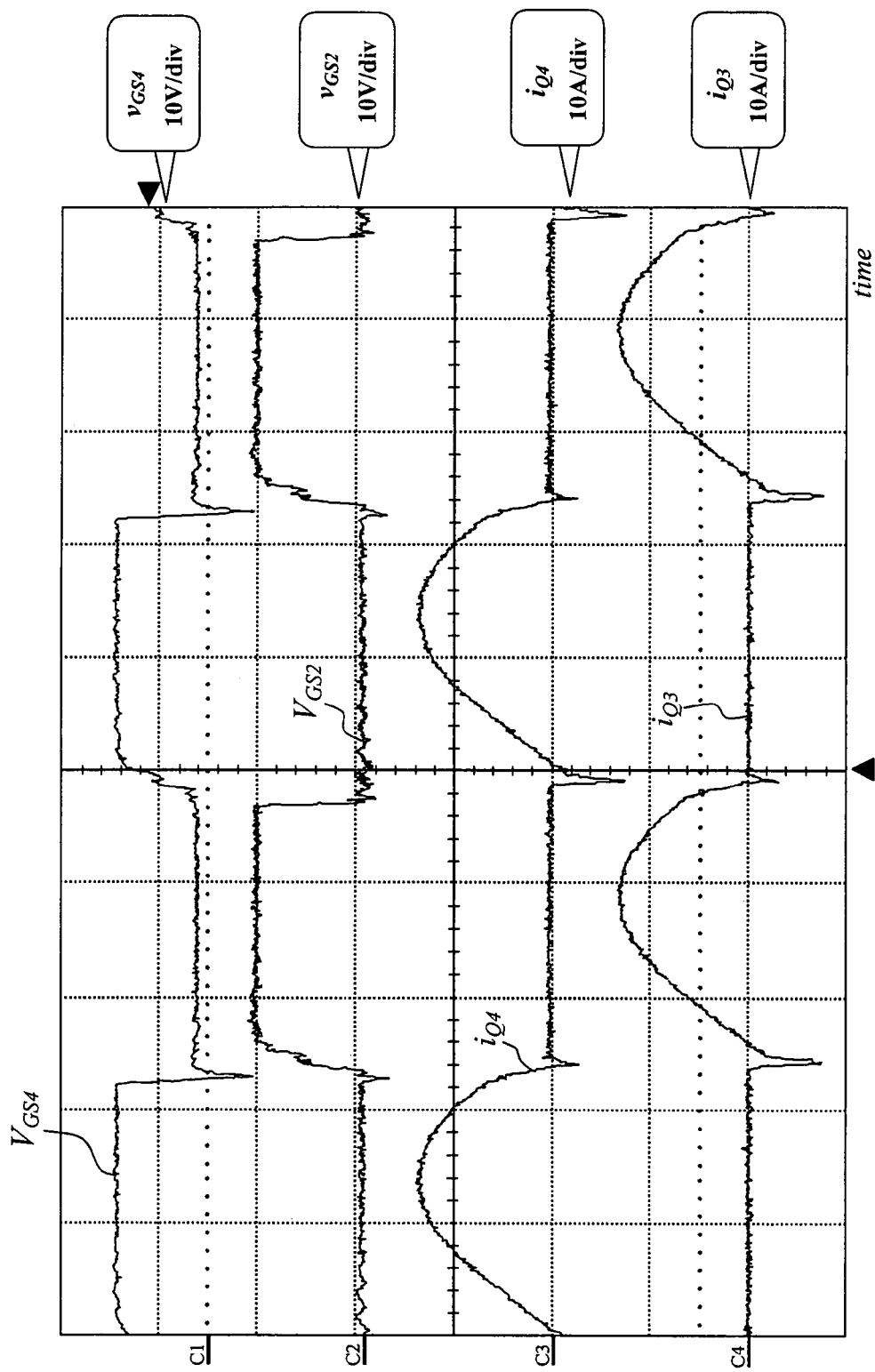
FIG. 6(b) shows signals of the resonant converter shown in FIG. 3 and FIG. 4 according to the present invention.

Please refer to FIG. 6(a) showing signals of the resonant converter shown in FIG. 3 and FIG. 4 according to the present invention, wherein the periodic changes of the first switch drive signal $v_{GS1}$, the second switch drive signal $v_{GS2}$, the resonant current $i_L$ and the resonant capacitance drop $v_{Cr}$ operating in the first frequency region Region-1 are presented. Please refer to FIG. 6(b) showing signals of the resonant converter shown in FIG. 3 and FIG. 4 according to the present invention, wherein the fourth switch drive signal $v_{SG4}$, the second switch drive signal $v_{GS2}$, the fourth switch rectification current $i_{Q4}$ and the third switch rectification current $i_{Q3}$ are presented. Please refer to FIG. 6(c) showing signals presenting the zero voltage switching of the resonant converter shown in FIG. 3 and FIG. 4 according to the present invention, wherein the zero voltage switching of the first switch 211 is presented.

Figure 6C:
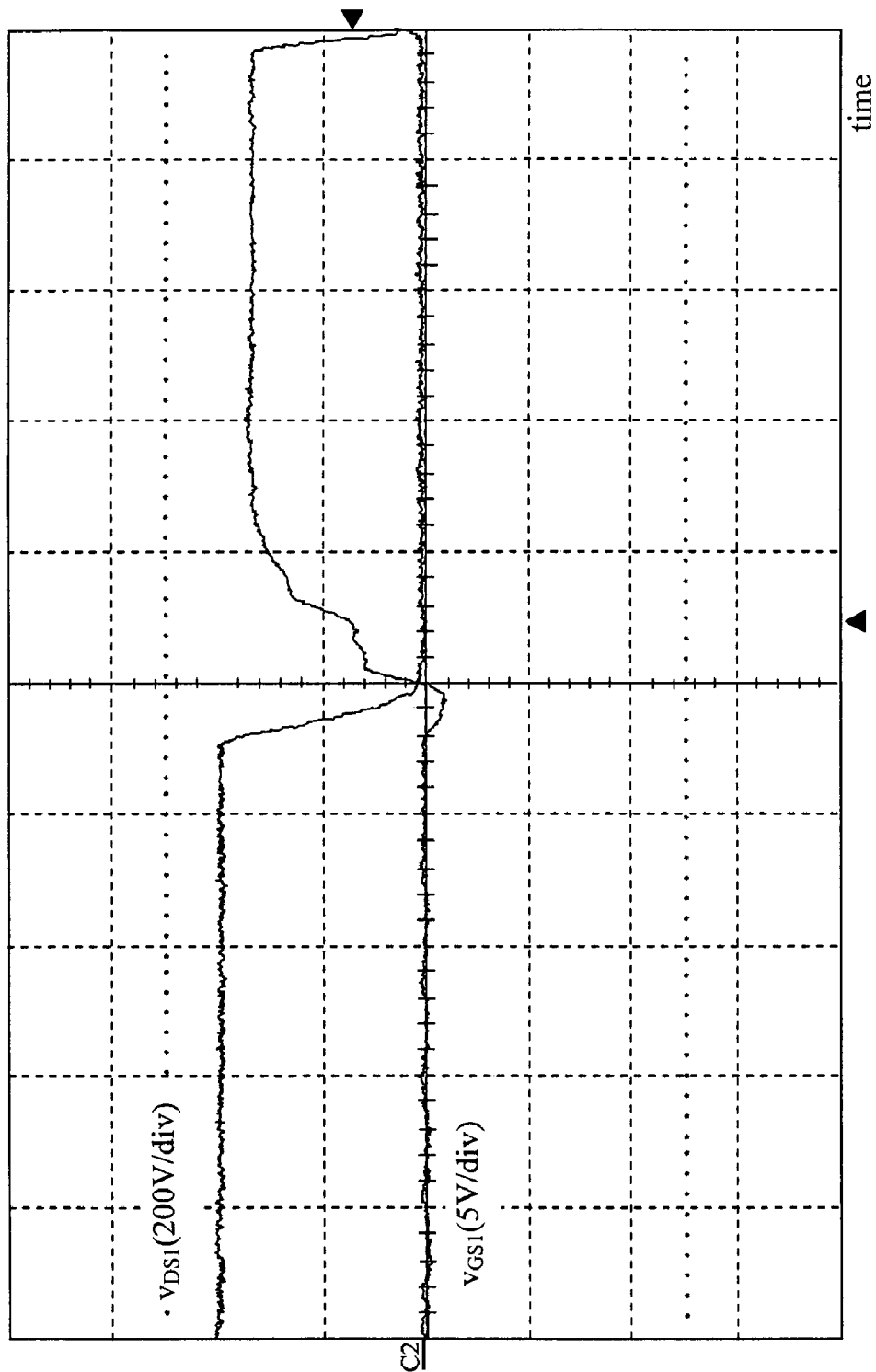
FIG. 6(c) shows signals presenting the zero voltage switching of the resonant converter shown in FIG. 3 and FIG. 4 according to the present invention.

As shown in FIGS. 6(a)-6(c), when the resonant converter 60 has an operation switching frequency $f_s$ higher than a resonant frequency thereof, the first switch drive signal is identical to the fourth switch drive signal, the second switch drive signal is identical to the third switch drive signal, and the first switch drive signal and the second switch drive signal are alternately produced, the first switch and the second switch have the zero voltage switching, the third switch and the fourth switch have the zero voltage switching, and the third switch rectification current and the fourth switch rectification current have the quasi-sine waveform.

Figure 7:
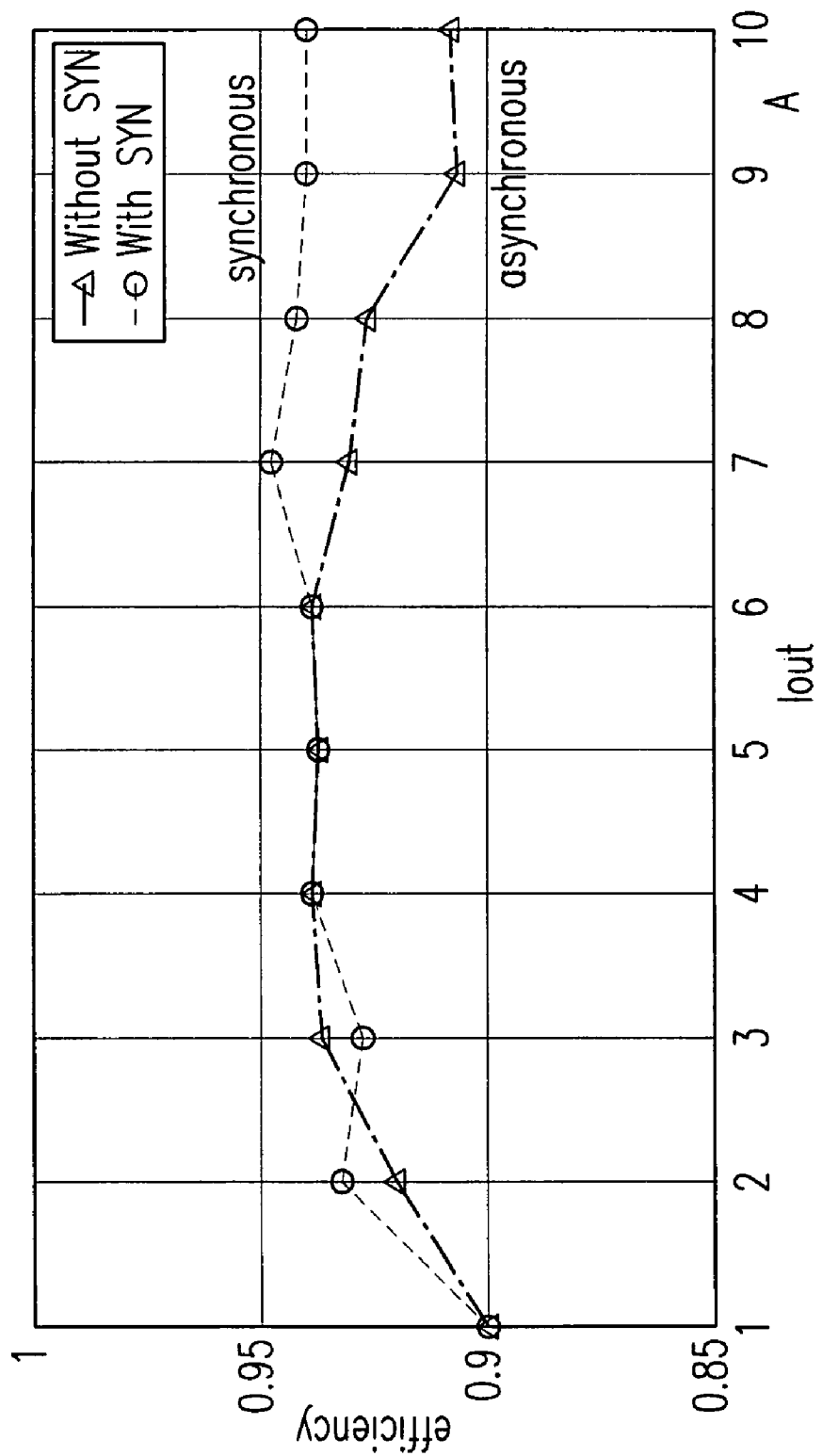
FIG. 7 is a diagram showing the comparison of the power efficiency between the resonant converter shown in FIG. 1 and the resonant converter of the present invention.

Please refer to FIG. 7 showing the comparison of the power efficiency between the resonant converter shown in FIG. 1 and the resonant converter of the present invention. As shown in FIG. 7, the efficiency of the synchronous rectification resonant converter is higher than that of the rectification diode resonant converter when the output current is higher than 6 A, and the efficiency of the synchronous rectification resonant converter approximates to that of the rectification diode resonant converter when the output current is lower than 6 A.

It is characterized in the present invention that a resonant converter with a synchronous rectification drive circuit includes a switch circuit, a resonant circuit, a transformer, a full-wave-rectifier circuit and a synchronous rectification drive circuit, wherein the switch circuit at least includes a half-bridge circuit, the resonant circuit is coupled to the switch circuit and has a resonant frequency, the transformer has a primary side coupled to the resonant circuit, the full-wave-rectifier circuit is coupled to a secondary side of the transformer and includes two switches, the synchronous rectification drive circuit includes four voltage-clamped drive circuits having output terminals coupled to the switch circuit and the corresponding switch of the full-wave-rectifier circuit, and each voltage-clamped drive circuit includes a transmission/discharge circuit for reducing the turn-off period of the coupled switch during turning off the coupled switch.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A resonant converter with a synchronous rectification drive circuit, comprising:
   a switch circuit including at least one bridge arm having a first switch and a second switch;
   a resonant circuit coupled to the switch circuit and having a resonant frequency;
   a transformer having a primary side coupled to the resonant circuit and having a secondary side;
   a full-wave-rectifier circuit coupled to the secondary side and including a third switch and a fourth switch; and
   a synchronous rectification drive circuit including a first, a second, a third and a fourth voltage-clamped drive circuits, wherein output terminals of the voltage-clamped drive circuits are respectively coupled to the first, the second, the third and the fourth switches, and each of the voltage-clamped drive circuits includes a transmission/discharge circuit for reducing a turn-off period of the coupled switches during turning off the coupled switches.

2. The resonant converter with a synchronous rectification drive circuit according to the claim 1, wherein the switch circuit is one of a half-bridge circuit and a full-bridge circuit, and each of the first switch and the second switch is a power transistor including a main body, a body-diode and a parasitic junction capacitor.

3. The resonant converter with a synchronous rectification drive circuit according to the claim 1, wherein the resonant circuit includes a resonant capacitor, a resonant inductor and a magnetizing inductor in series.

4. The resonant converter with a synchronous rectification drive circuit according to the claim 1, wherein each of the third switch and the fourth switch is a power transistor including a main body and a body-diode.

5. The resonant converter with a synchronous rectification drive circuit according to the claim 1, wherein each of the voltage-clamped drive circuits includes:
   a clamp circuit changing an AC drive signal into a DC drive signal; and
   the transmission/discharge circuit coupled to the clamp circuit and having an output terminal coupled to one of the first switch, the second switch, the third switch and the fourth switch for forming one of a first switch drive signal, a second switch drive signal, a third switch drive signal and a fourth switch drive signal.

6. The resonant converter with a synchronous rectification drive circuit according to the claim 1, further comprising:

a first drive transformer having a first primary side winding set and two first secondary side winding sets, wherein the first primary side winding set is connected to a first couple capacitor in series for receiving a first phase signal, and the first secondary side winding sets are coupled to the first voltage-clamped drive circuit and the fourth voltage-clamped drive circuit, respectively; and a second drive transformer having a second primary side winding set and two second secondary side winding sets, wherein the second primary winding set is connected to a second couple capacitor in series for receiving a second phase signal, and the second secondary side winding sets are coupled to the second voltage-clamped drive circuit and the third voltage-clamped drive circuit, respectively.

7. The resonant converter with a synchronous rectification drive circuit according to the claim 1, further comprising:

a first isolator having a first input terminal coupled to a drive signal producing device for receiving a first phase signal and having a first output terminal coupled to the fourth voltage-clamped drive circuit for preventing the first phase signal from being interfered by a first signal from the fourth voltage-clamped drive circuit; and a second isolator having a second input terminal coupled to the drive signal producing device for receiving a second phase signal and having a second output terminal coupled to the third voltage-clamped drive circuit for preventing the second phase signal from being interfered by a second signal from the third voltage-clamped drive circuit.

8. The resonant converter with a synchronous rectification drive circuit according to the claim 1, wherein the voltage-clamped drive circuits respectively provide a first, a second, a third and a fourth switch drive signals according to an operation switching frequency and the resonant frequency of the resonant converter for respectively driving the switches.

9. The resonant converter with a synchronous rectification drive circuit according to the claim 5, wherein the clamp circuit includes:

a clamp capacitor; and a clamp diode.

10. The resonant converter with a synchronous rectification drive circuit according to the claim 5, wherein the transmission/discharge circuit includes:

a transmission diode passing the DC drive signal therethrough; and a discharge transistor coupled to the clamp circuit, the transmission diode and the coupled switches for accelerating a discharge path during turning off the coupled switches.

11. The resonant converter with a synchronous rectification drive circuit according to the claim 7, wherein each of the first isolator and the second isolator is a drive transformer.

12. The resonant converter with a synchronous rectification drive circuit according to the claim 7, wherein each of the first isolator and the second isolator is an optical coupler.

13. The resonant converter with a synchronous rectification drive circuit according to the claim 8, wherein as the operation switch frequency is higher than the resonant frequency, the first switch drive signal is identical to the fourth switch drive signal, the second switch drive signal is identical to the third switch drive signal, and the first switch drive signal and the second switch drive signal are alternately produced.

* * * * *